United States Patent [19]

Blake et al.

[11] 4,344,973

[45] Aug. 17, 1982

[54] METHOD FOR CURING AND SMOKING PORK SKINS TO CONDITION THEM FOR RENDERING

[76] Inventors: Anthony A. Blake, 816 Forest Hills Dr.; Neil W. Blake, 5309 Clear Run Dr., both of Wilmington, N.C. 28403

[21] Appl. No.: 308,123

[22] Filed: Oct. 2, 1981

Related U.S. Application Data

[63] Continuation-in-part of Ser. No. 203,951, Nov. 4, 1980, abandoned.

[51] Int. Cl.³ .......................... A23B 4/02; A23B 4/04
[52] U.S. Cl. .................................. 426/264; 426/456; 426/520; 426/641; 426/652
[58] Field of Search ............... 426/244, 246, 264, 265, 426/266, 302, 303, 310, 534, 641, 645, 652, 456, 465, 466, 520, 315; 260/412.6

[56] References Cited

U.S. PATENT DOCUMENTS

| | | |
|---|---|---|
| 2,179,616 | 11/1939 | Darrow . |
| 2,345,463 | 3/1944 | Cox . |
| 2,547,747 | 4/1951 | Darrow . |
| 2,562,850 | 7/1951 | Winslow . |
| 2,839,409 | 6/1958 | Matlen . |
| 2,907,660 | 10/1959 | O'Brian et al. . |
| 2,947,635 | 8/1960 | Paynter et al. . |
| 2,974,047 | 3/1961 | Holmes . |
| 3,059,272 | 10/1962 | Millenaar . |
| 3,255,689 | 6/1966 | Kielsmeier et al. . |
| 3,401,045 | 9/1968 | Halpern . |
| 3,462,282 | 8/1969 | Fessmann . |
| 3,519,438 | 7/1970 | Connick . |
| 4,119,742 | 10/1978 | Stupec .................................. 426/641 |
| 4,163,804 | 8/1979 | Meyer et al. ................... 426/641 X |

*Primary Examiner*—Arthur L. Corbin
*Attorney, Agent, or Firm*—Lane, Aitken, Kice & Kananen

[57] ABSTRACT

A method for processing pork skins in which a liquid smoke and a curing solution are applied to the skins after which they are continuously passed on a conveyor belt through an enclosure containing heat which is regulated so that the skins are cured and smoked. The temperature of the skins is controlled so that the skins are cured and smoked but are not rendered or popped.

9 Claims, 3 Drawing Figures

METHOD FOR CURING AND SMOKING PORK SKINS TO CONDITION THEM FOR RENDERING

CROSS REFERENCE TO RELATED APPLICATIONS

This application is a continuation-in-part of Applicant's copending application Ser. No. 203,951, filed Nov. 4, 1980, now abandoned.

BACKGROUND OF THE INVENTION

This invention relates to a method and apparatus for processing pork skins, and more particularly to an apparatus for curing and smoking pork skins to condition them for rendering.

Traditionally, pork products, such as ham and bacon, have been cured in their processing stage prior to being introduced on the market to preserve them and extend their shelf life, and to improve their flavor. Curing techniques usually involve the step of applying a curing solution to the meat and then placing slabs of the meat in a smokehouse for several hours. In the smokehouse the meat would be subjected to a source of heat, usually in the form of hot air which is blown across the meat to raise its temperature and "set the cure", i.e., activate the curing ingredients, after which the meat was then ready for further processing.

In these smokehouses the meat would also often be subjected to a smoking process in which smoke, usually made from the sawdust of hickory wood, would be passed over the meat at the elevated temperature to add a smoked flavor to the meat and incidentally aid in preserving the meat. Alternatively, the meats were dipped in or sprayed or fogged with liquid smoke before or while being subjected to the elevated temperature to obtain the smoked flavor.

After the meats were subjected to the curing and smoking processes described above, the skins would be removed from the slabs of meat and the meat further processed for ultimate consumption. The skins could be "rendered" which entails subjecting them to an elevated temperature to remove the grease and then placing them in hot grease to "pop" them and form dry pork skins. Since the aforementioned curing and smoking imparted a delicious flavor to the skins, the rendered and popped skins often would be cut up into small pieces and marketed as a snack, not unlike potato chips.

However, it was later discovered that the pork meat could be better penetrated by the curing and smoking solution and would retain a more satisfying color from an aesthetic standpoint if the skin was stripped off the meat before the aforementioned curing and smoking processes. Thus, in order to produce the popped pork skins, the skins would have to be subjected to a separate curing and smoking process to preserve them and produce a satisfying flavor. If this was carried out in a smokehouse according to the traditional method discussed above, the skins would have to be individually placed on trucks or racks in the smokehouse and subjected to the heat required for curing and smoking for several hours before being removed from the smokehouse. The labor involved in this type of processing would be prohibitive from a cost standpoint. Also, the application of the hot air would tend to blow the skins together causing them to stick together, which would further complicate matters.

SUMMARY OF THE INVENTION

It is therefore an object of the present invention to provide a method for processing pork skins in which the skins are cured and smoked before rendering and popping in an efficient, simple manner without the need for a smokehouse.

It is a still further object of the present invention to provide a method of the above type in which the skins are cured and smoked in a relatively short period of time to condition them for being rendered and popped.

It is a still further object of the present invention to provide a method of the above type in which the skins are passed on a conveying system through an enclosure at an elevated temperature which enables them to be cured and smoked in a relatively short period of time with minimal labor involved.

Toward the fulfillment of these and other objects, according to the method of the present invention, a liquid smoke and a curing solution are initially applied to the skins after which they are continuously passed on a conveyor belt through an enclosure containing a source of heat. Prior to being exposed to the heat, the skins are dried by blowing hot air across the skins. The temperature of the skins is controlled so that the skins are cured and smoked but are not rendered.

DESCRIPTION OF THE DRAWINGS

The above brief description, as well as further objects, features and advantages of the present invention will be more fully appreciated by reference to the following detailed description of a presently preferred but nonetheless illustrative embodiment in accordance with the present invention, when taken in conjunction with the accompanying drawings wherein.

DESCRIPTION OF THE PREFERRED EMBODIMENT

Figure 1:
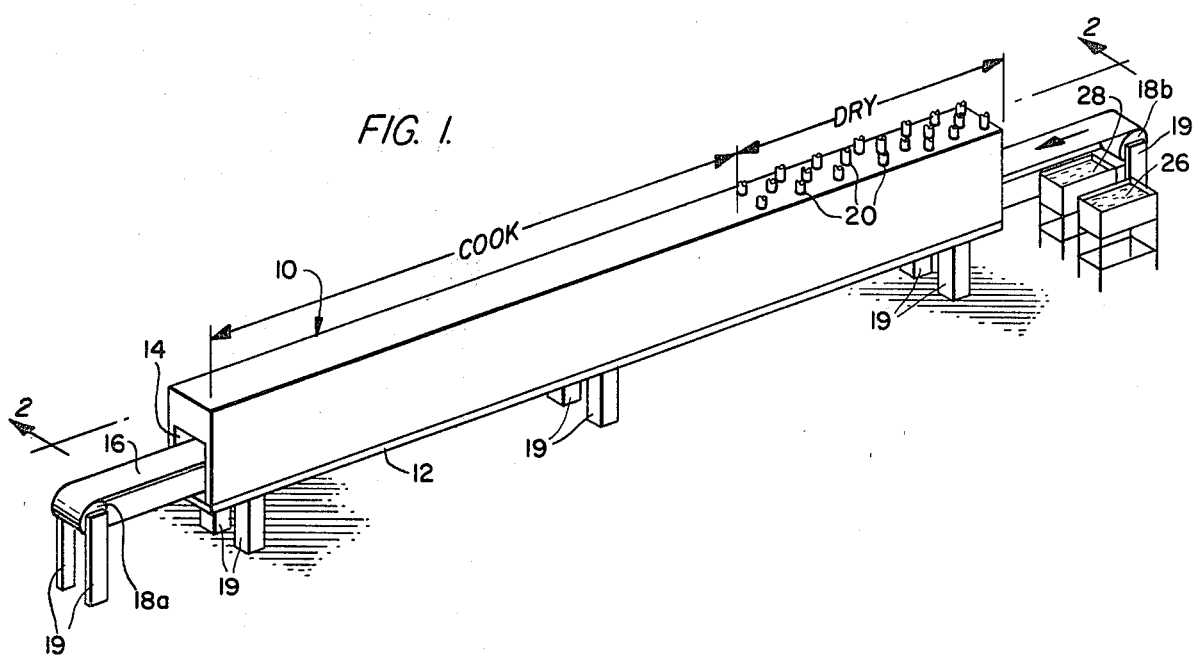
FIG. 1 is a perspective view depicting the apparatus according to the present invention.
Figure 2:
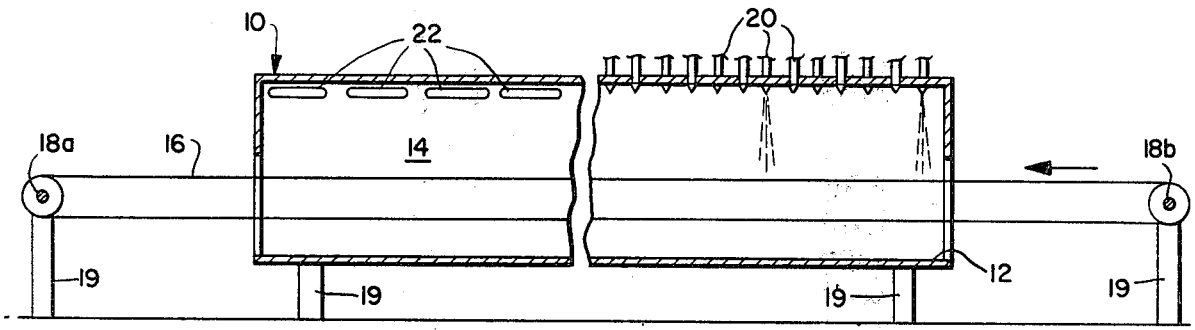
FIG. 2 is an enlarged horizontal, cross-sectional view taken along the line 2—2 of FIG. 1.
Figure 3:
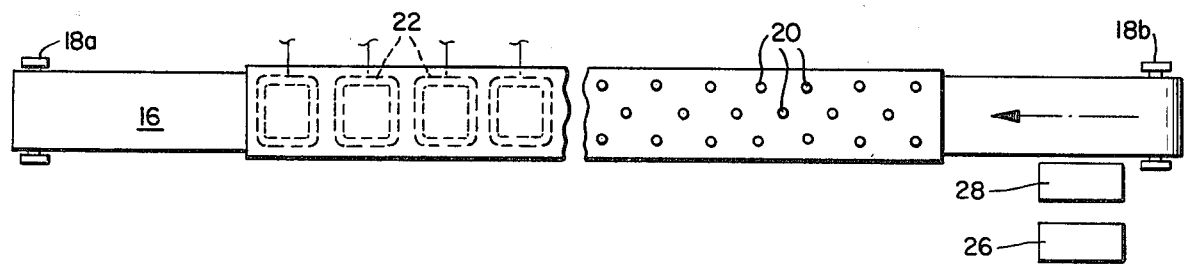
FIG. 3 is a top plan view of the apparatus of FIG. 2.

Referring specifically to the drawings, the reference numeral 10 refers in general to an elongated enclosure which rests over a support table, or stand, 12. The enclosure 10 has a U-shaped cross section and together with the stand 12 defines an elongated chamber 14 extending for the length of the enclosure.

An endless conveyor belt 16 extends through the chamber 14 and is mounted between a pair of rollers 18a and 18b disposed at each end of the enclosure 10. Although not shown in the drawings, it is understood that a drive system is provided for driving one or more of the rollers 18a or 18b in a conventional manner so that the belt passes continuously between the rollers and through the chamber 14. The support stand 12 and the rollers 18a and 18b are all disposed in an elevated position by support legs 19.

A plurality of air nozzles 20 are mounted through openings formed in the upper portion of the enclosure 10 and extend in a spaced relationship along one end portion thereof. The nozzles 20 are to be connected to a source of hot air (not shown) for blowing the air into the chamber 14 in a direction perpendicular to the direction of movement of the conveyor belt 16.

A source of heat, in the form of a plurality of electrical heating elements 22 supported in the upper portion of the enclosure, is provided for subjecting the skins to an elevated temperature. The heating elements 22 are located adjacent the air nozzles 20 and are disposed in a spaced relationship along the remaining length of the enclosure 10. The heating elements 22 are adapted to be connected to a source of AC power (not shown) for activating the heating elements and producing a predetermined amount of heat under the control of a thermostat or the like.

A pair of troughs 26 and 28 are provided adjacent the leading end of the conveyor belt 16 and contain a curing solution and a liquid smoke, respectively. The curing solution can be of a conventional type which would include water, salt, sugar, at least one sodium compound, and dextrose. The liquid smoke can also be of a conventional type and is made from hickory wood sawdust which is available commercially. The width of the belt 16 and the size of the troughs 26 and 28 can be such that they accommodate pork skins of the standard size of 14 inches by 28 inches. The skins are placed on the belt with their "skin" side facing upwardly and their "fat" side, downwardly.

The speed of the conveyor belt 16 is controlled in relation to the heat applied by the heating elements 22 and the amount of hot air passed through the nozzles 20 so that, after being dipped in the curing solution and the liquid smoke and applied to the conveyor belt 14, the air passing from the nozzles 20 will dry the skins and the heat from the elements will activate the curing solution and the liquid smoke and impart a golden brown color to the skins as they pass through the entire length of the chamber 14. More particularly, these parameters are regulated so that the internal temperature (referred to in the industry as the "internal meat temperature") attains a value sufficient to activate the curing and smoking solution which, according to industry standards, is approximately 128° F.

According to an important feature of the present invention the above parameters are also regulated so that the internal temperature does not exceed the cooking temperature, which according to industry standards, is approximately 148°–150° F. This is particularly important since, if the internal temperature of the skins exceeds approximately 150° then the aforementioned rendering process begins, which is specifically avoided according to the present invention since it is much preferred that the rendering and popping processes discussed above be performed separately from the curing and smoking process of the present invention.

According to a preferred embodiment the speed of the conveyor belt 16 and the length of the belt passing underneath the nozzles 20 and the heating elements 22 are such that the skins on the belt would be exposed to the air from the nozzles for approximately one minute and to the direct heat from the heating elements for approximately two minutes. The upper surface of the belt 16, and therefore the skins, are spaced approximately five inches from the heating elements 22 and the heat from the elements 22 is regulated so that the temperature in the chamber 14 below the heating elements is approximately 500° F. In this manner, the outer skin surface is toasted and the internal temperature attains a value of approximately 130° F. which is sufficient to activate (i.e., "set") the curing and smoking solutions yet insufficient to initiate the rendering process.

This insures that the skins are completely cured and smoked, and imparts a golden brown color to the skins without burning them. The skins are then ready for the rendering and popping techniques discussed above.

The process of the present invention thus provides several major improvements over the previous curing and smoking techniques involving a smokehouse as discussed above. For example, according to the present invention much better control over the processing of the individual skins is possible since, for example, the heat energy to which the skins are subjected can be adjusted "on line". Also the time required to process the skins is reduced from hours to minutes. Further, a significant reduction in labor and energy is achieved.

It is understood that the above parameters can be varied in accordance with production requirements, size and space limitations, etc. within the scope of the invention. For example, the speed of the conveyor belt, the amount of heat to which the skins are exposed and the particular manner in which the heat is applied can be varied as long as the skins are cured and smoked but not rendered. Also, the conveyor belt 16 can be constructed of a double width with the troughs 26 and 28 being located on each side of the belt so that the production would be double that discussed above. Further the heat sources associated with the enclosure 10 can be varied within the scope of the invention. For example, the electrical heating elements can be replaced by any other conventional source of heat such as hot air, or the like.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention therein.

What is claimed is:

1. A method of curing and smoking pork skins preparatory to them being rendered and popped, said method comprising the steps of, prior to rendering or popping said skins, applying a curing solution to the skins; applying a liquid smoke to the skins; continuously passing the skins through an enclosure; blowing heated air over the skins to dry the exposed surface of the skins in a portion of said enclosure; then applying direct heat from a heat source to said skins for a predetermined time in another portion of said enclosure; and regulating the temperature of said heat, the proximity of said skins to the source of heat, and said predetermined time so that the internal temperature of the skins is sufficient to activate the curing solution and the liquid smoke and insufficient to render the skins.

2. The method of claim 1 wherein said temperature, said proximity and said predetermined time are regulated so that the internal temperature of said skins is at least 128° F.

3. The method of claims 1 or 2 wherein said temperature, said proximity and said predetermined time are regulated so that the internal temperature of said skins does not exceed 150° F.

4. The method of claim 1 wherein said step of applying a curing solution to the skins occurs before said step of applying a liquid smoke to the skins.

5. The method of claim 1 wherein said skins are passed through said conveyor on a conveyor belt which passes through said enclosure.

6. The method of claim 7 further comprising the step of regulating the speed of said conveyor belt so that said heat is applied to said skins for a period of approximately two minutes.

7. The method of claim 11 wherein the temperature in said enclosure is approximately 500° F.

8. The method of claim 1 wherein said step of applying a liquid smoke comprises the step of dipping the skins in a vessel containing said liquid smoke.

9. The method of claim 1 wherein said step of applying a curing solution comprises the step of dipping the skins in a vessel containing said curing solution.

* * * * *